(12) United States Patent
Goleski et al.

(10) Patent No.: US 9,423,005 B2
(45) Date of Patent: Aug. 23, 2016

(54) MULTI-SPEED TRANSMISSION

(71) Applicant: FORD GLOBAL TECHNOLOGIES, LLC, Dearborn, MI (US)

(72) Inventors: Gregory Daniel Goleski, Rochester Hills, MI (US); Donald Edward Hoffman, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 265 days.

(21) Appl. No.: 13/852,391

(22) Filed: Mar. 28, 2013

(65) Prior Publication Data

US 2014/0045641 A1    Feb. 13, 2014

Related U.S. Application Data

(63) Continuation-in-part of application No. 13/569,462, filed on Aug. 8, 2012, and a continuation-in-part of application No. 13/771,660, filed on Feb. 20, 2013.

(51) Int. Cl.
*F16H 3/66* (2006.01)
*F16H 3/62* (2006.01)
*F16H 3/44* (2006.01)

(52) U.S. Cl.
CPC .. *F16H 3/62* (2013.01); *F16H 3/66* (2013.01); *F16H 2003/442* (2013.01); *F16H 2200/0065* (2013.01); *F16H 2200/2012* (2013.01); *F16H 2200/2046* (2013.01); *F16H 2200/2082* (2013.01)

(58) Field of Classification Search
CPC ............................ F16H 3/62; F16H 2200/2082
See application file for complete search history.

(56) References Cited

U.S. PATENT DOCUMENTS

| | | | |
|---|---|---|---|
| 3,190,147 A | 6/1965 | Livingston | |
| 4,420,992 A | 12/1983 | Windish | |
| 4,683,776 A | 8/1987 | Klemen | |
| 4,788,887 A | 12/1988 | Lepelletier | |
| 6,176,803 B1 | 1/2001 | Meyer et al. | |
| 6,893,373 B2 * | 5/2005 | Kawamoto | F16H 3/666 475/302 |
| 6,955,627 B2 | 10/2005 | Thomas et al. | |
| 6,960,149 B2 | 11/2005 | Ziemer | |
| 7,163,484 B2 | 1/2007 | Klemen | |
| 7,276,011 B2 | 10/2007 | Tabata et al. | |

(Continued)

FOREIGN PATENT DOCUMENTS

WO    2011020894 A1    2/2011
WO    2011020897 A1    2/2011

OTHER PUBLICATIONS

Definition of Transfer Gears, snapshot taken from http://www.larapedia.com/glossary_of_technical_and_automotive_terms/transfer_gears_meaning_in_technical_and_automotive_terminology.html on Jun. 8, 2016.*

(Continued)

*Primary Examiner* — Robert Hodge
*Assistant Examiner* — Stacey Fluhart
(74) *Attorney, Agent, or Firm* — James Dottavio; Brooks Kushman P.C.

(57) ABSTRACT

A transmission gearing arrangement produces at least nine forward speed ratios and one reverse speed ratio by selective engagement of three shift elements in various combinations. One embodiment includes four simple planetary gear sets, four clutches, and two brakes. Another embodiment includes two axis transfer gear pairs, three simple planetary gear sets, four clutches, and two brakes.

20 Claims, 4 Drawing Sheets

(56) References Cited

U.S. PATENT DOCUMENTS

| | | | |
|---|---|---|---|
| 7,556,852 B2 | 7/2009 | Aoki et al. | |
| 7,635,315 B2 | 12/2009 | Kamm et al. | |
| 7,878,941 B2 | 2/2011 | Hukill et al. | |
| 7,998,013 B2 | 8/2011 | Phillips et al. | |
| 8,016,708 B2 | 9/2011 | Diosi et al. | |
| 8,052,566 B2 | 11/2011 | Wittkopp et al. | |
| 8,052,567 B2 | 11/2011 | Hart et al. | |
| 8,113,984 B2 | 2/2012 | Wittkopp et al. | |
| 8,177,674 B2 | 5/2012 | Baldwin | |
| 8,187,139 B2 | 5/2012 | Baldwin | |
| 8,210,982 B2 | 7/2012 | Gumpoltsberger et al. | |
| 8,231,495 B2 | 7/2012 | Gumpoltsberger et al. | |
| 8,231,501 B2 | 7/2012 | Gumpoltsberger et al. | |
| 8,241,171 B2 | 8/2012 | Gumpoltsberger et al. | |
| 8,246,504 B2 | 8/2012 | Gumpoltsberger et al. | |
| 8,251,859 B2 | 8/2012 | Gumpoltsberger et al. | |
| 8,287,420 B2 | 10/2012 | Gumpoltsberger et al. | |
| 8,303,455 B2 | 11/2012 | Gumpoltsberger et al. | |
| 8,398,522 B2 | 3/2013 | Bauknecht et al. | |
| 8,403,803 B2 | 3/2013 | Gumpoltsberger et al. | |
| 8,425,370 B2 | 4/2013 | Leesch et al. | |
| 8,496,556 B2 | 7/2013 | Wittkopp et al. | |
| 2005/0202922 A1 | 9/2005 | Thomas et al. | |
| 2008/0108473 A1 | 5/2008 | Shim | |
| 2009/0011887 A1* | 1/2009 | Komada | B60K 6/36 475/5 |
| 2009/0298638 A1* | 12/2009 | Jang et al. | 475/275 |
| 2010/0035718 A1* | 2/2010 | Saitoh | F16H 3/66 475/271 |
| 2010/0210403 A1 | 8/2010 | Wittkopp et al. | |
| 2011/0009228 A1 | 1/2011 | Bauknecht et al. | |
| 2011/0009229 A1 | 1/2011 | Bauknecht et al. | |
| 2011/0045936 A1 | 2/2011 | Gumpoltsberger et al. | |
| 2011/0045937 A1 | 2/2011 | Gumpoltsberger et al. | |
| 2011/0045938 A1 | 2/2011 | Gumpoltsberger et al. | |
| 2011/0045939 A1 | 2/2011 | Gumpoltsberger et al. | |
| 2011/0045940 A1 | 2/2011 | Gumpoltsberger et al. | |
| 2011/0045941 A1 | 2/2011 | Gumpoltsberger et al. | |
| 2011/0045942 A1 | 2/2011 | Gumpoltsberger et al. | |
| 2011/0045943 A1 | 2/2011 | Gumpoltsberger et al. | |
| 2011/0207575 A1 | 8/2011 | Kraynev et al. | |
| 2011/0300983 A1 | 12/2011 | Kurokawa | |
| 2012/0071289 A1 | 3/2012 | Wittkopp et al. | |
| 2012/0100952 A1 | 4/2012 | Wittkopp et al. | |
| 2012/0115671 A1 | 5/2012 | Gumpoltsberger et al. | |
| 2012/0115672 A1 | 5/2012 | Gumpoltsberger et al. | |
| 2012/0122626 A1 | 5/2012 | Gumpoltsberger et al. | |
| 2012/0122627 A1 | 5/2012 | Gumpoltsberger et al. | |
| 2012/0135834 A1 | 5/2012 | Gumpoltsberger et al. | |
| 2012/0135835 A1 | 5/2012 | Gumpoltsberger et al. | |
| 2012/0142486 A1 | 6/2012 | Gumpoltsberger et al. | |
| 2012/0149526 A1 | 6/2012 | Gumpoltsberger et al. | |
| 2012/0157259 A1 | 6/2012 | Phillips | |
| 2012/0165153 A1 | 6/2012 | Borgerson et al. | |
| 2012/0165154 A1 | 6/2012 | Wittkopp et al. | |
| 2012/0172173 A1 | 7/2012 | Wittkopp et al. | |
| 2013/0196813 A1 | 8/2013 | Oita et al. | |
| 2013/0196814 A1 | 8/2013 | Gumpoltsberger et al. | |
| 2013/0274059 A1 | 10/2013 | Beck et al. | |
| 2014/0045639 A1 | 2/2014 | Goleski | |
| 2014/0051542 A1 | 2/2014 | Baek et al. | |
| 2014/0087910 A1 | 3/2014 | Thomas et al. | |

OTHER PUBLICATIONS

H. Benford, M. Leising, The Lever Analogy: A New Tool in Transmission Analysis, 1982, Society of Automotive Engineers, Inc. 810102, p. 429-437.

* cited by examiner

MULTI-SPEED TRANSMISSION

CROSS-REFERENCE TO RELATED APPLICATIONS

This application is a continuation-in-part of U.S. application Ser. No. 13/569,462 filed Aug. 8, 2012, the disclosure of which is incorporated in its entirety by reference herein. This application is also a continuation-in-part of U.S. application Ser. No. 13/771,660 filed Feb. 20, 2013, the disclosure of which is incorporated in its entirety by reference herein.

TECHNICAL FIELD

This disclosure relates to the field of automatic transmissions for motor vehicles. More particularly, the disclosure pertains to an arrangement of gears, clutches, and the interconnections among them in a power transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

DETAILED DESCRIPTION

Figure 1:
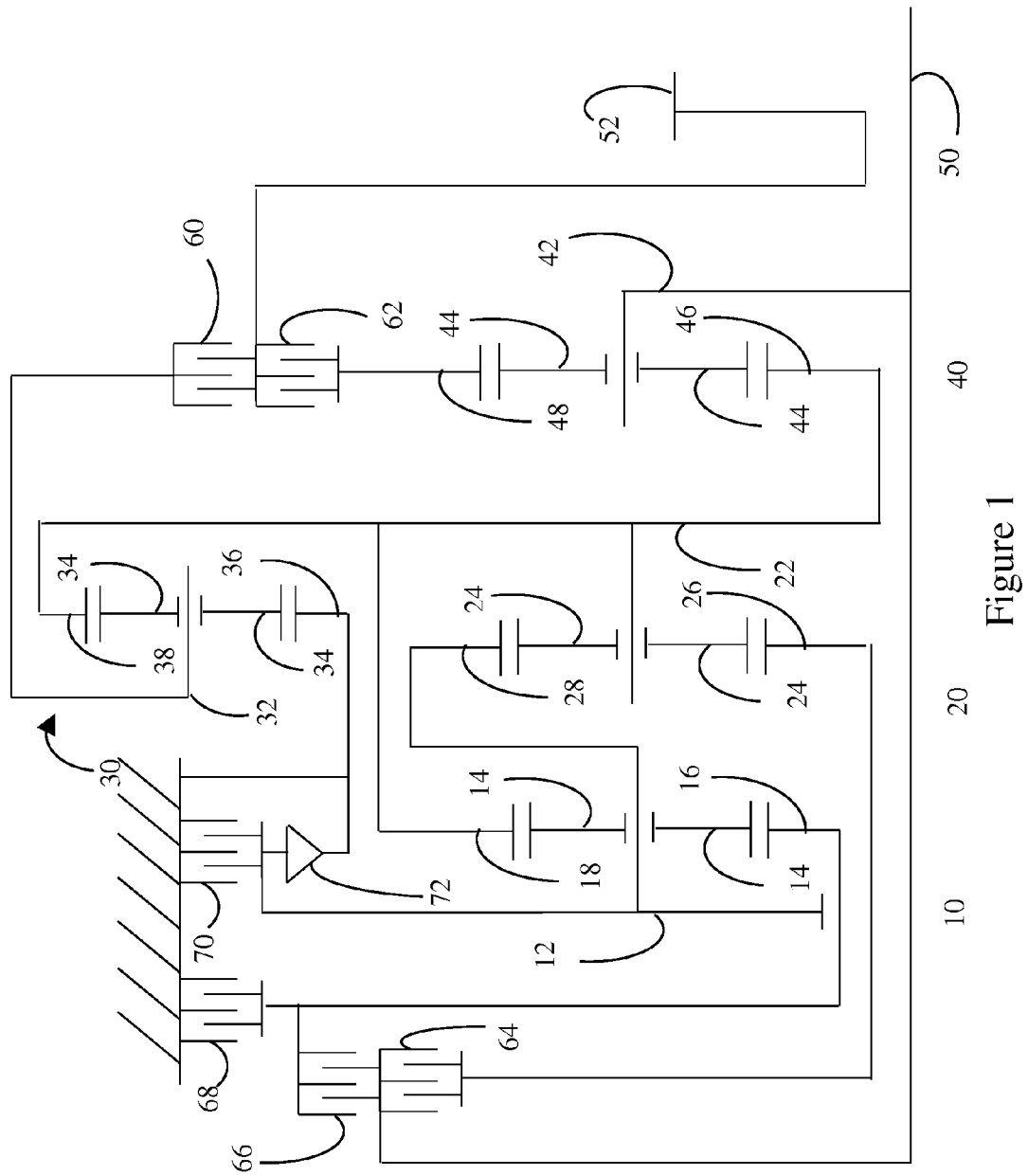
FIG. 1 is a schematic diagram of a first transmission gearing arrangement.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A gearing arrangement is a collection of rotating elements and shift elements configured to impose specified speed relationships among the rotating elements. Some speed relationships, called fixed speed relationships, are imposed regardless of the state of any shift elements. Other speed relationships, called selective speed relationships, are imposed only when particular shift elements are fully engaged. A linear speed relationship exists among an ordered list of rotating elements when i) the first and last rotating element in the group are constrained to have the most extreme speeds, ii) the speeds of the remaining rotating elements are each constrained to be a weighted average of the first and last rotating element, and iii) when the speeds of the rotating elements differ, they are constrained to be in the listed order, either increasing or decreasing. The speed of an element is positive when the element rotates in one direction and negative when the element rotates in the opposite direction. A discrete ratio transmission has a gearing arrangement that selectively imposes a variety of speed ratios between an input and an output.

A group of rotating elements are fixedly coupled to one another if they are constrained to rotate as a unit in all operating conditions. Rotating elements can be fixedly coupled by spline connections, welding, press fitting, machining from a common solid, or other means. Slight variations in rotational displacement between fixedly coupled elements can occur such as displacement due to lash or shaft compliance. One or more rotating elements that are all fixedly coupled to one another may be called a shaft. In contrast, two rotating elements are selectively coupled by a shift element when the shift element constrains them to rotate as a unit whenever it is fully engaged and they are free to rotate at distinct speeds in at least some other operating condition. A shift element that holds a rotating element against rotation by selectively connecting it to the housing is called a brake. A shift element that selectively couples two or more rotating elements to one another is called a clutch. Shift elements may be actively controlled devices such as hydraulically or electrically actuated clutches or brakes or may be passive devices such as one way clutches or brakes. Two rotating elements are coupled if they are either fixedly coupled or selectively coupled.

Figure 2:
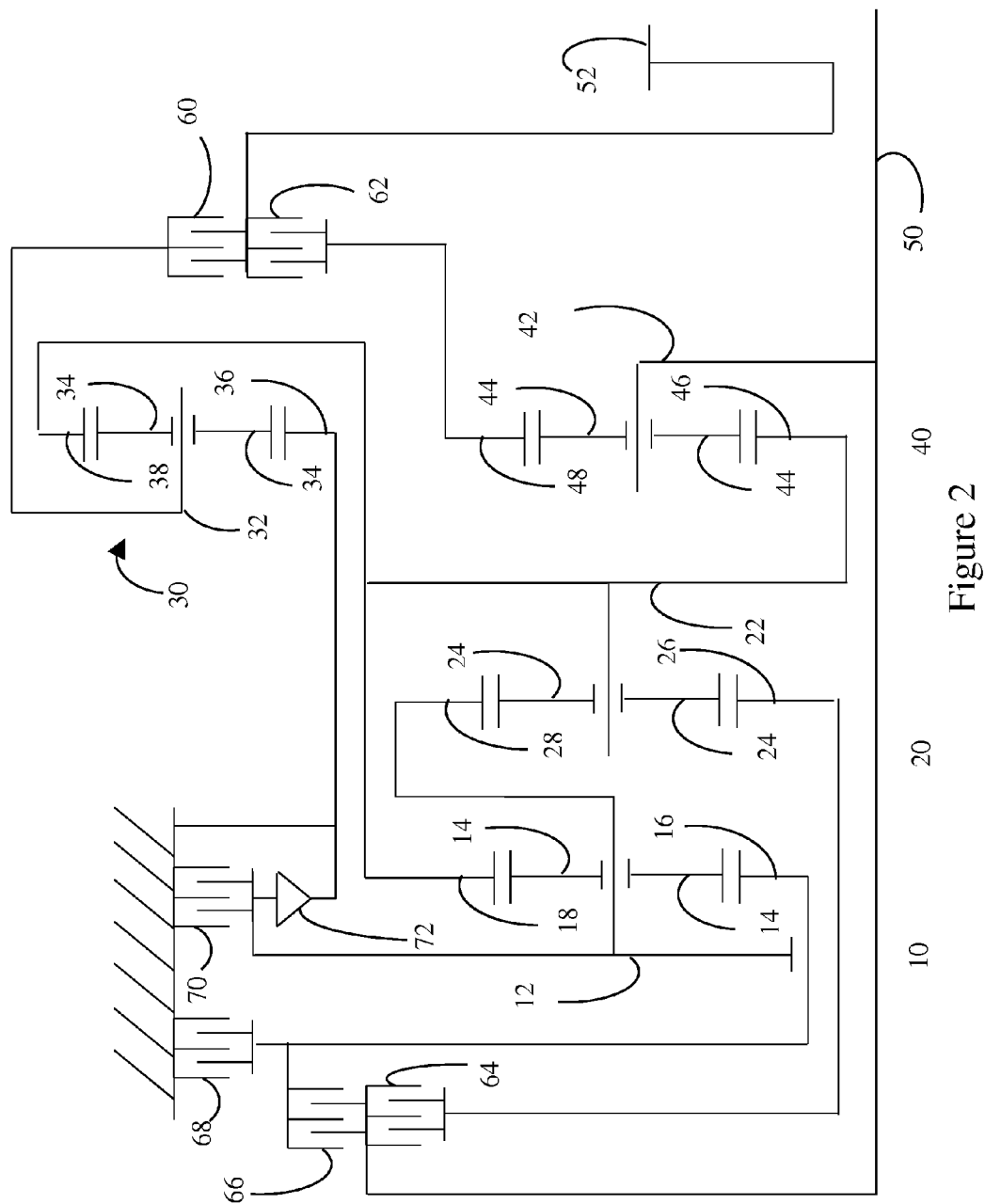
FIG. 2 is a schematic diagram of a second transmission gearing arrangement.

FIGS. 1 and 2 depict a transaxle that provides a variety of speed ratios between input 50 and output 52. Input 50 may be driven by an internal combustion engine or other prime mover. A launch device such as torque converter or launch clutch may be employed between the prime mover and transaxle input 50 permitting the engine to idle while the vehicle is stationary and a transaxle ratio is selected. Output 52 may be a sprocket driving a chain that transmits power to a differential axis. Alternatively, output 52 may be a gear that transmits power to a differential axis through a series of meshes. In a longitudal arrangement, input 50 would enter from the left and output 52 would be a shaft extending to the right.

The transaxle of FIGS. 1 and 2 utilizes four simple planetary gear sets 10, 20, 30, and 40. A planet carrier 12 rotates about a central axis and supports a set of planet gears 14 such that the planet gears rotate with respect to the planet carrier. External gear teeth on the planet gears mesh with external gear teeth on a sun gear 16 and with internal gear teeth on a ring gear 18. The sun gear and ring gear are supported to rotate about the same axis as the carrier. Gear sets 20, 30, and 40 are similarly structured. Gear set 30 may be positioned beside the other gear sets. However, to reduce axial length, gear set 30 may be positioned radially outside gear sets 10 and 20 as shown in FIG. 1 or radially outside gear set 40 as shown in FIG. 2.

A simple planetary gear set is a type of gearing arrangement that imposes a fixed linear speed relationship among the sun gear, the planet carrier, and the ring gear. Other known types of gearing arrangements also impose a fixed linear speed relationship among three rotating elements. For example, a double pinion planetary gear set imposes a fixed linear speed relationship between the sun gear, the ring gear, and the planet carrier.

A suggested ratio of gear teeth for each planetary gear set is listed in Table 1.

TABLE 1

| | |
|---|---|
| Ring 18/Sun 16 | 2.00 |
| Ring 28/Sun 26 | 1.80 |
| Ring 38/Sun 36 | 1.50 |
| Ring 48/Sun 46 | 2.00 |

Sun gear 36 is fixedly held against rotation; carrier 42 is fixedly coupled to input 50; carrier 12 is fixedly coupled to ring gear 28; and ring gear 18, carrier 22, ring gear 38, and sun gear 46 are mutually fixedly coupled. Output 52 is selectively coupled to carrier 32 by clutch 60 and selectively coupled to ring gear 48 by clutch 62. Input 50 is selectively coupled to sun gear 26 by clutch 64. Sun gear 16 is selectively coupled to input 50 by clutch 66 and selectively held against rotation by brake 68. The combination of carrier 12 and ring gear 28 is selectively held against rotation by brake 70. Optional one-way-brake 72 passively precludes the combination of carrier 12 and ring gear 28 from rotating in a negative direction while permitting rotation in the positive direction.

Various combinations of gear sets, clutches, and brakes selectively impose particular speed relationships. The combination of gear sets 10 and 20 impose a linear speed relationship among sun gear 16, the combination of carrier 12 and ring gear 28, the combination of ring 18 and carrier 22, and sun gear 26. The combination of gear set 30 and clutch 60 selectively imposes an underdrive relationship between carrier 22 and output 52. In other words, when clutch 60 is engaged, output 52 is constrained to rotate slower than carrier 22 and in the same direction.

As shown in Table 2, engaging the shift elements in combinations of three establishes nine forward speed ratios and one reverse speed ratio between input 50 and output 52. An X indicates that the shift element is required to establish the speed ratio. An (X) indicates the clutch can be applied but is not required. In 4th gear, clutches 60 and 62 establish the power flow path between input 50 and output 52. Any one of the remaining shift elements can also be applied. Applying clutch 64 ensures that all single and two step shifts from 4th gear can be accomplished by engaging only one shift element and releasing only one shift element. When the gear sets have tooth numbers as indicated in Table 1, the speed ratios have the values indicated in Table 2.

TABLE 2

| | 60 | 62 | 64 | 66 | 68 | 70 | Ratio | Step |
|---|---|---|---|---|---|---|---|---|
| Rev | X | | | X | | X | −3.33 | 71% |
| 1st | X | | X | | | X | 4.67 | |
| 2nd | X | | X | | X | | 2.67 | 1.75 |
| 3rd | X | | X | X | | | 1.67 | 1.60 |
| 4th | X | X | (X) | | | | 1.22 | 1.36 |
| 5th | | X | X | X | | | 1.00 | 1.22 |
| 6th | | X | X | | X | | 0.84 | 1.19 |
| 7th | | X | X | | | X | 0.76 | 1.11 |
| 8th | | X | | | X | X | 0.67 | 1.14 |
| 9th | | X | | X | | X | 0.57 | 1.17 |

Figure 3:
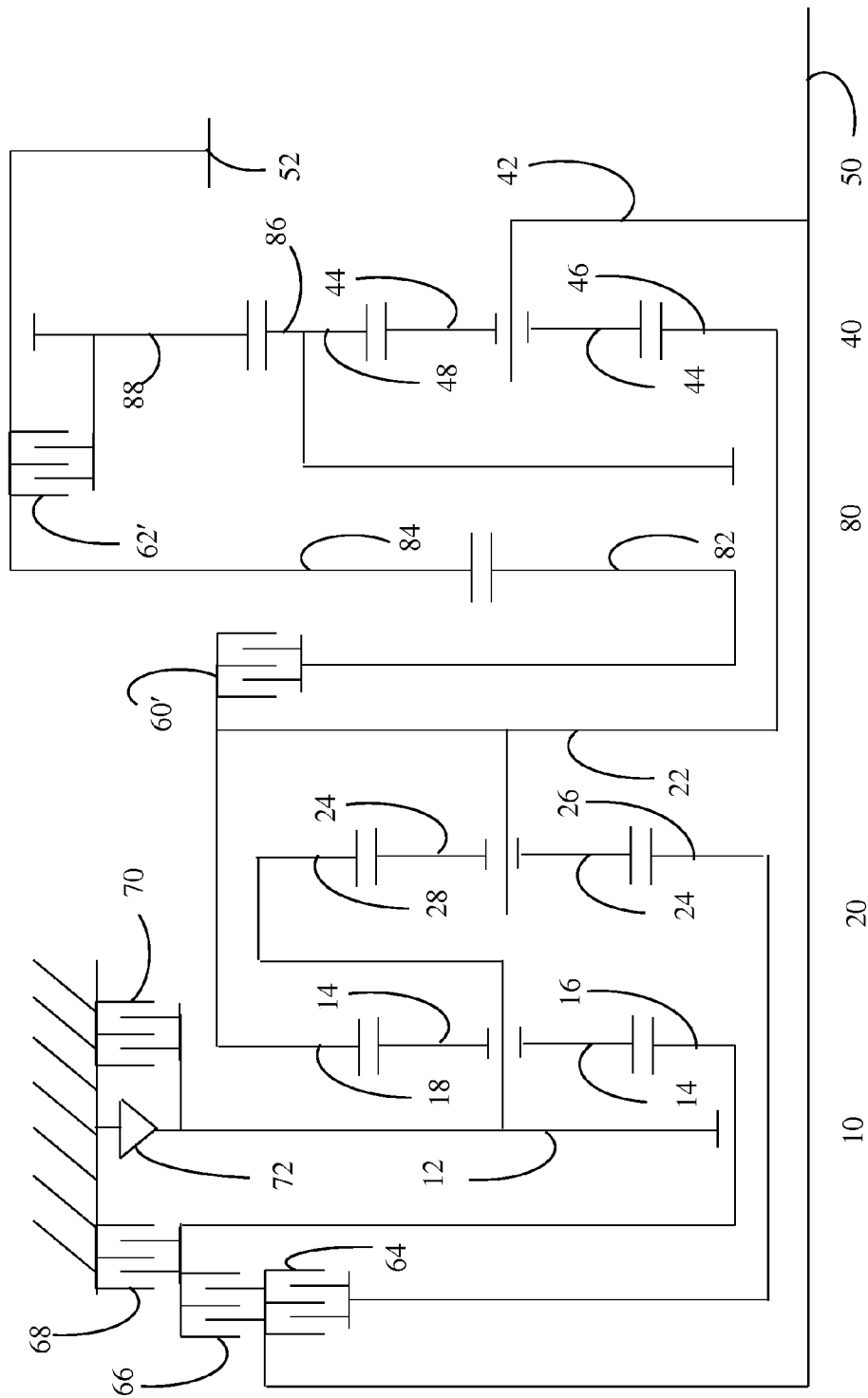
FIG. 3 is a schematic diagram of a third transmission gearing arrangement.
Figure 4:
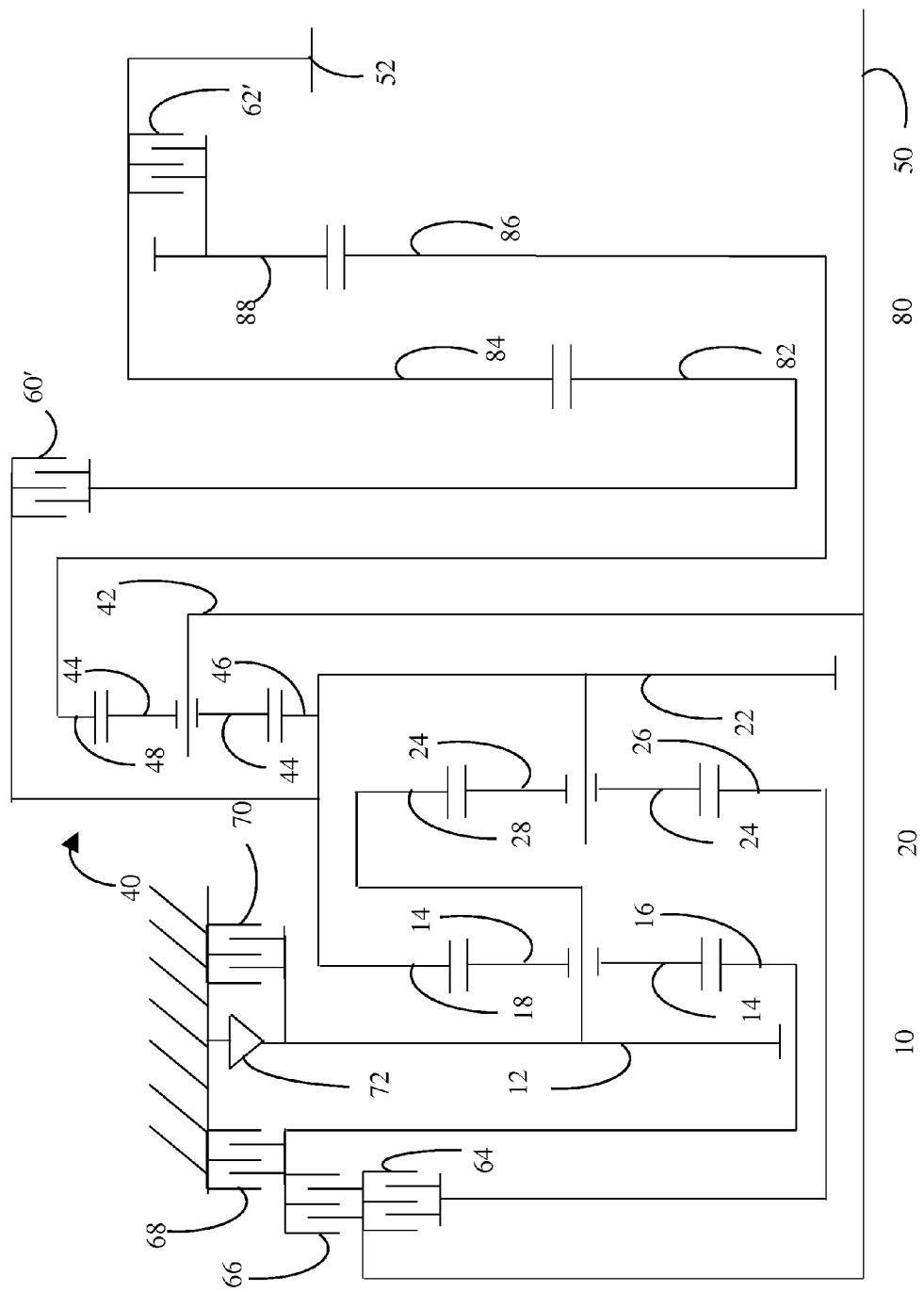
FIG. 4 is a schematic diagram of a fourth transmission gearing arrangement.

A second example transaxle is illustrated in FIGS. 3 and 4. This transaxle utilizes three simple planetary gear sets 10, 20, and 40, each having a sun gear, a ring gear, and a planet carrier supported for rotation about a first axis. Additionally, axis transfer gears 82 and 86 are supported for rotation about this first axis. Gear 86 is radially larger than gear 82. Output gear 52 and axis transfer gears 84 and 88 are supported for rotation about a second axis substantially parallel to the first axis. Output 52 transmits power to a differential axis through an additional gear mesh. Gear 84 meshes with gear 82 and gear 88 meshes with gear 86. Carrier 42 is fixedly coupled to input 50; axis transfer gear 84 is fixedly coupled to output gear 52; carrier 12 is fixedly coupled to ring gear 28; and ring gear 18, carrier 22, and sun gear 46 are mutually fixedly coupled. Axis transfer gear 82 is selectively coupled to carrier 22 by clutch 60'. Output gear 52 is selectively coupled to axis transfer gear 88 by clutch 62'. Input 50 is selectively coupled to sun gear 26 by clutch 64. Sun gear 16 is selectively coupled to input 50 by clutch 66 and selectively held against rotation by brake 68. The combination of carrier 12 and ring gear 28 is selectively held against rotation by brake 70. Optional one-way-brake 72 passively precludes the combination of carrier 12 and ring gear 28 from rotating in a negative direction while permitting rotation in the positive direction.

To save axial space, gear 86 may be located radially outside of ring gear 48 as shown in FIG. 3. Alternatively, planetary gear set 40 may be located radially outside of planetary gear sets 10 and 20 as shown in FIG. 4.

Various combinations of gear sets, clutches, and brakes selectively impose particular speed relationships. The combination of gear sets 10 and 20 impose a linear speed relationship among sun gear 16, the combination of carrier 12 and ring gear 28, the combination of ring 18 and carrier 22, and sun gear 26. The combination of axis transfer gear 82, axis transfer gear 84, and clutch 60' selectively imposes a first speed ratio between carrier 22 and output 52. In other words, when clutch 60' is engaged, the speed of output 52 divided by the speed of carrier 22 is a first fixed value, which is a negative value. Similarly, the combination of axis transfer gear 86, axis transfer gear 88, and clutch 62' selectively imposes a second speed ratio between ring gear 48 and output 52. When clutch 62' is engaged, the speed of output 52 divided by the speed of ring gear 48 is a second fixed value. The second fixed value is also negative value but is greater in absolute value than the first fixed value.

A suggested ratio of gear teeth for each planetary gear set and each pair of axis transfer gears is listed in Table 3.

TABLE 3

| | |
|---|---|
| Ring 18/Sun 16 | 1.88 |
| Ring 28/Sun 26 | 1.65 |
| Ring 48/Sun 46 | 2.00 |
| Gear 84/Gear 82 | 1.68 |
| Gear 88/Gear 86 | 1.06 |

As shown in Table 4, engaging the shift elements in combinations of three establishes nine forward speed ratios and one reverse speed ratio between input 50 and output 52. When the gear sets have tooth numbers as indicated in Table 3, the speed ratios have the values indicated in Table 4.

TABLE 4

|  | 60' | 62' | 64 | 66 | 68 | 70 | Ratio | Step |
|---|---|---|---|---|---|---|---|---|
| Rev | X |  |  | X |  | X | −3.14 | 71% |
| 1st | X |  | X |  |  | X | 4.44 |  |
| 2nd | X |  | X |  | X |  | 2.64 | 1.68 |
| 3rd | X |  | X | X |  |  | 1.67 | 1.57 |
| 4th | X | X | (X) |  |  |  | 1.26 | 1.32 |
| 5th |  | X | X | X |  |  | 1.06 | 1.19 |
| 6th |  | X | X |  | X |  | 0.90 | 1.18 |
| 7th |  | X | X |  |  | X | 0.81 | 1.11 |
| 8th |  | X |  |  | X | X | 0.71 | 1.14 |
| 9th |  | X |  | X |  | X | 0.60 | 1.18 |

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A transmission comprising:
   an input;
   an output;
   first, second, third, fourth, and fifth shafts;
   a first gearing arrangement configured to impose a fixed linear speed relationship among the first shaft, the second shaft, and the third shaft;
   a second gearing arrangement configured to impose a fixed linear speed relationship among the fourth shaft, the third shaft, and the second shaft;
   a third gearing arrangement configured to impose a fixed linear speed relationship among the third shaft, the input, and the fifth shaft;
   a fourth gearing arrangement configured to selectively constrain the output to rotate at a first speed ratio relative to the third shaft;
   a fifth gearing arrangement configured to selectively constrain the output to rotate at a second speed ratio relative to the fifth shaft, the second speed ratio having an absolute value greater than an absolute value of the first speed ratio;
   a first clutch configured to selectively couple the fourth shaft to the input;
   a second clutch configured to selectively couple the first shaft to the input;
   a first brake configured to selectively hold the first shaft against rotation; and
   a second brake configured to selectively hold the second shaft against rotation.

2. The transmission of claim 1 further comprising a one-way-brake configured to constrain the second shaft to rotate in only one direction.

3. The transmission of claim 1 wherein the first gearing arrangement comprises a first simple planetary gear set having a first sun gear fixedly coupled to the first shaft, a first ring gear fixedly coupled to the third shaft, a first planet carrier fixedly coupled to the second shaft, and at least one planet gear supported for rotation on the first planet carrier and in continuous meshing engagement with the first sun gear and the first ring gear.

4. The transmission of claim 1 wherein the second gearing arrangement comprises a second simple planetary gear set having a second sun gear fixedly coupled to the fourth shaft, a second ring gear fixedly coupled to the second shaft, a second planet carrier fixedly coupled to the third shaft, and at least one planet gear supported for rotation on the second planet carrier and in continuous meshing engagement with the second sun gear and the second ring gear.

5. The transmission of claim 1 wherein the third gearing arrangement comprises a third simple planetary gear set having a third sun gear fixedly coupled to the third shaft, a third ring gear fixedly coupled to the fifth shaft, a third planet carrier fixedly coupled to the input, and at least one planet gear supported for rotation on the third planet carrier and in continuous meshing engagement with the third sun gear and the third ring gear.

6. The transmission of claim 1 wherein the fourth gearing arrangement comprises:
   a fourth simple planetary gear set having a fourth sun gear fixedly held against rotation, a fourth ring gear fixedly coupled to the third shaft, a fourth planet carrier, and at least one planet gear supported for rotation on the fourth planet carrier and in continuous meshing engagement with the fourth sun gear and the fourth ring gear; and
   a third clutch configured to selectively couple the fourth planet carrier to the output.

7. The transmission of claim 6 wherein the fourth simple planetary gear set is positioned radially outside the first and second gearing arrangements.

8. The transmission of claim 6 wherein the fourth simple planetary gear set is positioned radially outside the third gearing arrangement.

9. The transmission of claim 1 wherein the fifth gearing arrangement comprises a fourth clutch configured to selectively couple the fifth shaft to the output.

10. The transmission of claim 1 wherein the input rotates about an input axis and the output rotates about an output axis parallel to and displaced from the input axis.

11. The transmission of claim 10 wherein the fourth gearing arrangement comprises:
    a first axis transfer gear supported for rotation about the input axis;
    a second axis transfer gear fixedly coupled to the output and in continuous meshing engagement with the first axis transfer gear; and
    a third clutch configured to selectively couple the first axis transfer gear to the third shaft.

12. The transmission of claim 10 wherein the fifth gearing arrangement comprises:
    a third axis transfer gear fixedly coupled to the fifth shaft;
    a fourth axis transfer gear supported for rotation about the output axis and in continuous meshing engagement with the third axis transfer gear; and a fourth clutch configured to selectively couple the fourth axis transfer gear to the output.

13. A transmission comprising:
an input configured to rotate about an input axis;
an output configured to rotate about an output axis offset from the input axis;
a first simple planetary gear set having a first sun gear, a first ring gear, a first planet carrier coupled to the input, and at least one planet gear supported for rotation on the first planet carrier and in continuous meshing engagement with the first sun gear and the first ring gear;
a first axis transfer gear coupled to the first sun gear;
a second axis transfer gear coupled to the output and in continuous meshing engagement with the first axis transfer gear;
a third axis transfer gear fixedly coupled to the first ring gear;
a fourth axis transfer gear coupled to the output and in continuous meshing engagement with the third axis transfer gear; and
a first gearing arrangement configured to selectively impose a plurality of fixed speed ratios between the input and the first sun gear.

14. The transmission of claim 13 wherein:
the first planet carrier is fixedly coupled to the input;
the first axis transfer gear is selectively coupled to the first sun gear by a first clutch;
the second axis transfer gear is fixedly coupled to the output; and
the fourth axis transfer gear is selectively coupled to the output by a second clutch.

15. The transmission of claim 14 wherein the first gearing arrangement comprises:
a second simple planetary gear set having a second sun gear, a second ring gear fixedly coupled to the first sun gear, a second planet carrier, and at least one planet gear supported for rotation on the second planet carrier and in continuous meshing engagement with the second sun gear and the second ring gear;
a third simple planetary gear set having a third sun gear, a third ring gear fixedly coupled to the second planet carrier, a third planet carrier fixedly coupled to the first sun gear, and at least one planet gear supported for rotation on the third planet carrier and in continuous meshing engagement with the third sun gear and the third ring gear;
a third clutch configured to selectively couple the third sun gear to the input;
a fourth clutch configured to selectively couple the second sun gear to the input;
a first brake configured to selectively hold the second sun gear against rotation; and
a second brake configured to selectively hold the second planet carrier against rotation.

16. The transmission of claim 15 further comprising a one-way-brake configured to constrain the second planet carrier to rotate in only one direction.

17. The transmission of claim 15 wherein the first simple planetary gear set is positioned radially outside the second and third simple planetary gear sets.

18. A transmission comprising:
a simple planetary gear set having a sun, a ring, and a carrier fixedly coupled to an input;
first and second axis transfer gears coupled to the sun and ring respectively;
third and fourth axis transfer gears coupled to an output and meshing with the first and second gears respectively; and
a gearing arrangement configured to selectively impose a plurality of fixed speed ratios between the input and the sun.

19. The transmission of claim 18 wherein the first axis transfer gear is selectively coupled to the sun and the third axis transfer gear is fixedly coupled to the output.

20. The transmission of claim 18 wherein the second axis transfer gear is fixedly coupled to the ring and the fourth axis transfer gear is selectively coupled to the output.

* * * * *